United States Patent

[11] 3,551,605

[72] Inventor Phineas J. Icenbice, Jr. Northridge, Calif.
[21] Appl. No. 690,616
[22] Filed Dec. 14, 1967
[45] Patented Dec. 29, 1970
[73] Assignee Republic Corporation Beverly Hills, Calif. a corporation of California

[54] TELEPHONE CALL HANDLING SYSTEM WITH NUMBER DISPLAY
15 Claims, 5 Drawing Figs.

[52] U.S. Cl. ........ 179/27
[51] Int. Cl. ........ H04m 3/64
[50] Field of Search ........ 179/27.2, 27.23, 16.45, 89VF

[56] References Cited

UNITED STATES PATENTS

| | | | |
|---|---|---|---|
| 2,908,764 | 10/1959 | Lindbloom ........ | 179/27(.2) |
| 3,046,342 | 7/1962 | Ostline et al. ........ | 179/7.1 |
| 3,133,153 | 5/1964 | Bonanno ........ | 179/7.1 |

*Primary Examiner*—William C. Cooper
*Attorneys*—Samuel Lindenberg and Arthur Freilich

ABSTRACT: A system is disclosed which is incorporable in presently existing telephone call handling equipment. The system includes an arrangement which stores and displays a multidigit number to be communicated via telephone trunk lines, so that numbers are communicated only after their accuracy is verified. The system includes control circuitry which is coupled to the telephone call handling equipment in order to reduce the number of steps which have to be manually performed.

INVENTOR.
PHINEAS J. ICENBICE, JR.
BY Lindenberg & Freilich
ATTORNEYS

| LINES | TONES | RESET | DECIMAL DIGITS | | | | | | | | | |
|---|---|---|---|---|---|---|---|---|---|---|---|---|
| | | | 0 | 1 | 2 | 3 | 4 | 5 | 6 | 7 | 8 | 9 |
| | 700 | | | X | X | | X | | | X | | |
| | 900 | | | X | | X | | X | | | X | |
| | 1100 | | | | X | X | | | X | | | X |
| | 1300 | | X | | | | X | X | X | | | |
| | 1500 | | X | | | | | | | X | X | X |
| L 1 | | 0 | 1 | 0 | 1 | 0 | 1 | 0 | 1 | 0 | 1 | 0 |
| L 2 | | 0 | 1 | 0 | 0 | 1 | 1 | 0 | 0 | 1 | 1 | 0 |
| L 3 | | 0 | 0 | 1 | 1 | 1 | 1 | 0 | 0 | 0 | 0 | 1 |
| L 4 | | 0 | 0 | 0 | 0 | 0 | 0 | 1 | 1 | 1 | 1 | 1 |

Fig. 2

INVENTOR.
PHINEAS J. ICENBICE, JR.
BY Lindenberg & Freilich
ATTORNEYS

INVENTOR.
PHINEAS J. ICENBICE, JR.
BY Lindenberg & Freilich
ATTORNEYS

INVENTOR.
PHINEAS J. ICENBICE, JR.
BY Lindenberg & Freilich
ATTORNEYS

INVENTOR.
PHINEAS J. ICENBICE, JR.
BY [signature]
ATTORNEYS

TELEPHONE CALL HANDLING SYSTEM WITH NUMBER DISPLAY

BACKGROUND OF THE INVENTION

1. Field of the Invention

The present invention generally relates to a telephone call handling system and, more particularly, to a system for automating certain manually performed tasks and improving the accuracy in handling telephone calls.

2. Description of the Prior Art

Since the introduction of direct distance dialing, the time and accuracy of handling telephone calls which require operator attention, has become more important. There are still many types of calls which are completed with operator assistance. These types include person-to-person calls, station-to-station calls, in which the operator is requested to obtain the called station, and calls from coin-operated telephones.

The typical procedure of processing a call, requiring operator assistance, can be described as follows:

The calling party first dials the digit 0 to obtain the operator. In the switchboard or telephone exchange, an operator makes the appropriate connections, by inserting a rear cord plug in the switchboard panel, in order to communicate with the calling party. Assuming that the call is a station-to-station call, the operator is told the number of the called station, hereafter referred to as the called station number. The operator generally marks the called station on a machine processable card and, thereafter, connects an appropriate front cord plug to an appropriate outgoing trunk line, which terminates at the operator's console or switchboard. Thereafter, the operator requests a sender by actuating a key-pulse button, known as the KP button. When a sender is available and is attached to the outgoing line, selected by the operator, a "-sender attached condition" is indicated to the operator, by means of an illuminated sender-attached lamp, known as the SA lamp Thereafter the operator sequentially enters the decimal digits of the called station number by means of a touch tone key set. After all the digits have been entered, a start button, known as the ST button is depressed by the operator, to indicate that the complete called station number has been communicated to the system for processing. The KP and ST buttons and the circuits associated therewith, as well as the SA lamp are standard parts of conventional switchboards, and are well known by their abbreviations by those familiar with the art.

Although an experienced operator can perform the above-described sequence of operation quite quickly, considering the large number of operators employed by the telephone companies and the extremely large number of telephone calls which they are required to process, any reduction of the time, required for call processing, would result in large savings. Furthermore, since many of these steps have to be manually performed, and therefore subject to human error, it would be most advantageous if some, or all, of the steps could be automated in order to reduce processing time, as well as to eliminate the human error factor.

OBJECTS AND SUMMARY OF THE INVENTION

It is a primary object of the present invention to provide improvements in a telephone call handling system.

Another object of the present invention is to provide an arrangement for automating certain steps which are at present manually performable in order to reduce call processing time. The sequence of operations is selected such that this device provides for the best overlapping of functions simultaneously in process.

Still a further object of the present invention is to provide a system, which is directly incorporable into presently existing telephone call handling systems, in order to reduce the number of manual steps which an operator has to perform during call processing.

Yet another object of the present invention is to provide a new system, adapted for incorporation in presently existing telephone call handling systems, in order to automate certain operations therein and thereby reduce call processing time, as well as the effects of human error.

These and other objects of the invention are achieved by providing a system capable of responding to the output signals from the key set which represent the digits of the called station number, in order to store them in a selected code in a storing unit, as well as to display them in decimal form, in a display unit. When utilizing the present system, the operator, upon hearing the called station number, enters it by means of the key set and is immediately provided with a display of the number, to confirm that the proper number has been entered. The system includes multipurpose control circuitry, the first one of which responds to the insertion of a rear cord plug by the operator in the inbound trunk in order to communicate with the calling party. A second control circuit is included which responds to the insertion of a front cord plug in the outbound trunk to produce a signal, analogous to a sender-request signal. When a sender-attached-condition signal is received by the system, the control circuitry automatically responds thereto, to read out in sequence the coded digits, stored in the digital storage unit and to convert them into signals usable by the system, before they are communicated thereto.

The control circuitry further provides a signal analogous to the ST signal after all the digits stored in the digital storage unit have been communicated to the system for use in selecting the proper telephone lines in order to reach the desired called station. Thus, several of the steps which are conventionally manually performed by an operator, are automatically performed by the system of the present invention, resulting in the desired objective, i.e., reduction in the call processing time, as well as increase in the processing accuracy due to the elimination or reduction of human error.

The novel features of the invention are set forth with particularity in the appended claims. The invention will best be understood from the following description when read in conjunction with the accompanying drawings.

BRIEF DESCRIPTION OF THE DRAWINGS

FIG. 2 is a truth table useful in explaining the relationships between decimal digits, two-tone signals and multibit binary numbers which are operated upon in the system of the present invention;

DESCRIPTION OF THE PREFERRED EMBODIMENTS

Figure 1:
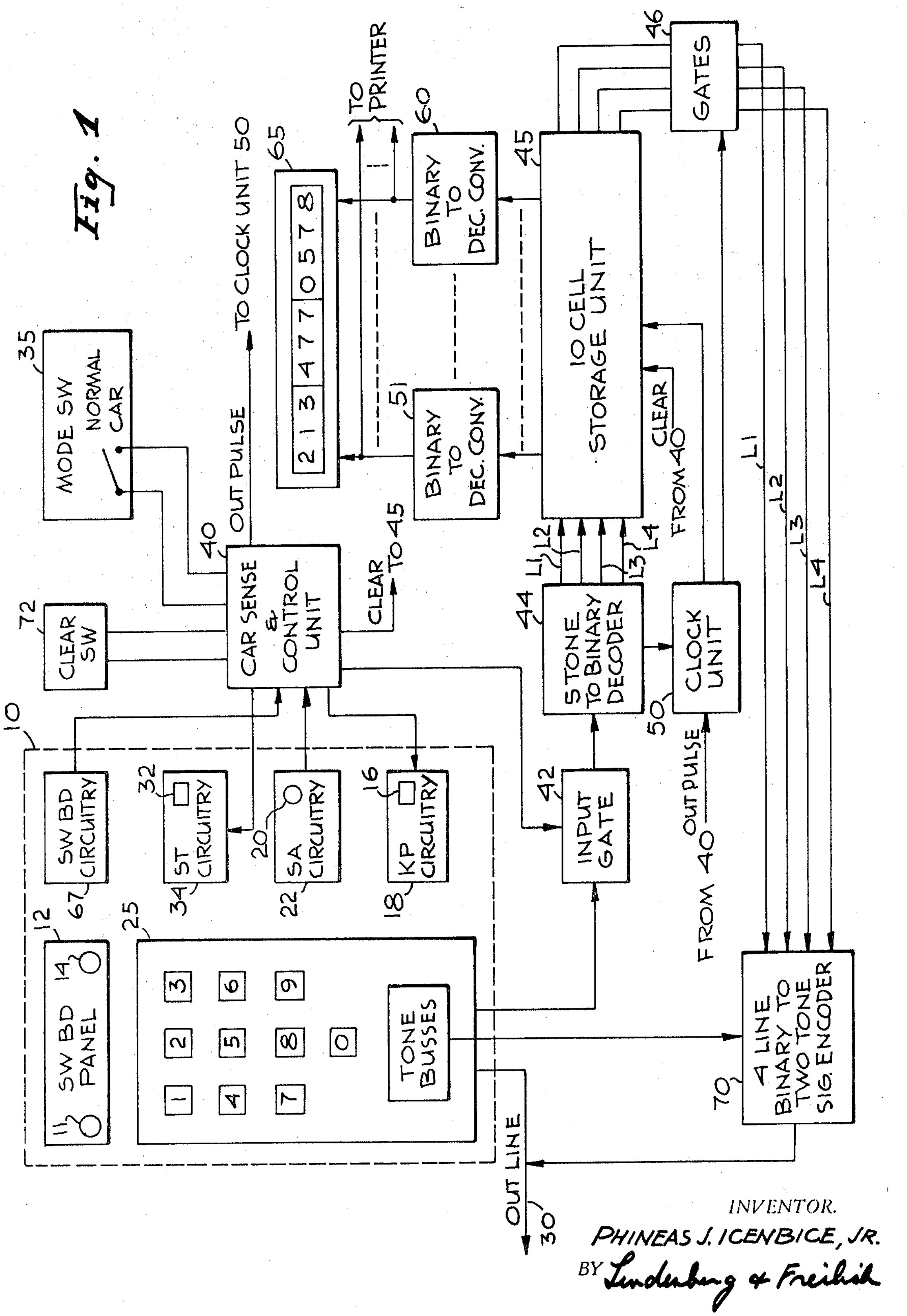
FIG. 1 is a general block diagram of the system of the present invention.

Reference is now made to FIG. 1, which a simplified block diagram of the present invention, shown coupled to an existing telephone system, and particularly to circuitry incorporated in a console or switchboard, of the type used by operators to obtain called station numbers from calling parties, as well as to record other data or information related thereto. In the FIG., all the circuitry which is incorporated in such a switchboard is surrounded by dashed line 10, which hereafter may also be referred to as the operator's switchboard. One example of such a primary switchboard is Model 3 CL used by the Bell Telephone Company.

Prior to detailing the novel features of the system of the present invention, the primary object of which is to reduce the time required for processing a telephone call by means of the switchboard, a brief description of the presently employed sequence of operation in call processing is believed to be in order. Briefly, an operator reaches a calling party by first inserting a plug of a rear (not shown) in a cord receptacle or jack 11 of a switchboard panel 12 and thereafter depressing a related talk switch (not shown). After receiving the called station number from the calling party the operator marks the number on a machine-processable card. Then, the operator connects a plug of a front cord (not shown) to an outgoing trunk line, by inserting the front cord in a receptacle or jack 14 in the panel. After the front cord plug is properly attached, the operator depresses a KP button 16 which forms part of a KP circuitry 18, thereby requesting a sender to be attached to the cord in panel 12.

When a sender is attached as requested, a lamp 20 of SA circuitry 22 is illuminated, to indicate to the operator that the system is ready to receive the called station number. The illumination of the lamp 20 can be thought of as indicating a "-sender attached condition." Then, the operator enters the called station number, by sequentially depressing keys of the key set 25, in a manner similar to entering a called station number in a telephone with pushbuttons rather than by the conventional arrangement which uses a rotary dial. As each key of set 25 is depressed, the system produces a two-tone signal, corresponding to the particular decimal digit associated with the depressed key. Each two-tone signal is supplied to the system over an outline, generally designated in FIG. 1 by numeral 30.

The decimal digit two-tone signal relationship generally employed in the Bell Telephone System is represented by the truth table of FIG. 2, to which reference is made herein. As may be seen therefrom, the decimal digit zero (0) is represented by a signal consisting of tones at frequencies of 1300 and 1500 hertz (Hz), while decimal digit one (1) is represented by tones at frequencies 700 and 900 Hz., decimal digit 2 by a signal with tones at 700 and 1100 Hz., etc.

Assuming that the called station number consists of 10 digits, including the area code, after all the digits are communicated to the system, the operator depresses an ST button 32 of the ST circuitry 34 to indicate to the system that the complete called station number has been transmitted thereto. After the actuation of the ST button 32, the signals which represent the digits of the called station number are utilized by the system, in manners well known by those familiar with the telephone art, to reach the called station.

When a party at the called station answers the telephone in a station-to-station call, or when the designated person is reached at the called station in a person-to-person call, the operator generally marks the card, bearing the called station number, with the start time of the call. This is generally accomplished by inserting the card in a calculagraph (not shown) which marks the card with the desired "connect" time. The card is similar inserted in the calculagraph at the end of the conversation to mark the end of conversation time, or "disconnect" time, so that the duration of the conversation could be automatically determined, in order to compute the necessary charges.

Although a trained operator can perform the aforementioned sequence of operations quite quickly and relatively accurately, the processing time is not insignificant, and human error is unavoidable. It is towards reducing processing time and minimizing, if not practically eliminating the undesired effects of human error that the present invention is primarily directed.

Briefly, when using the system of the present invention, the need to manually depress KP button 16, observe lamp 20 of SA circuitry 22 and subsequently depress ST button 32 is eliminated. When utilizing the system of the present invention, the only steps which an operator has to manually perform are to insert the rear cord plug in jack 11 to reach the calling party, to enter the called station number by means of keys of set 25 and connect a front cord to plug to jack 14 of the panel 12, in that order.

By connecting the rear cord plug, the system of the present invention is automatically enabled, so that when the key set is operated, two-tone signals are supplied to the system for decoding and subsequent storing. By connecting the front cord plug to jack 14 of panel 12, the system automatically requests a sender which, when available, automatically actuates the system to supply to outline 30 signals which represent the decimal digits of the called station number. After all the digits have been supplied, a signal analogous to an end-of-message signal is produced to actuate the telephone system to use the signals to reach the called station.

The embodiment of the present invention, to be described hereafter in detail, is one which is intended to be used in conjunction with a presently existing operator switchboard, without limiting the operator's ability to use the board in a conventional or normal mode. The system includes a mode switch which is under operator control. When the switch is in the normal position, the system of the present invention is effectively deenergized and the operator has to follow the conventional sequence of operations hereinbefore described. On the other hand when the switch is in the automatic or calling, advancing, recording mode, hereafter referred to as the CAR mode, advantage is taken of the novel features of the present invention. Such a switch is designated in FIG. 1 by numeral 35.

When switch 35 is in the CAR position or mode it enables a CAR sense and control unit 40 to respond to signals supplied thereto in order to control the system's operation. A first control circuit in unit 40 responds to an enabling signal, provided when a rear cord plug is inserted in jack 11, to in turn enable input gate 42, so that as each key of the key set 25 is actuated, the two-tone signal produced in response thereto is supplied to a five-tone to binary decoder 44. The function of decoder 44 is to convert each two-tone signal, supplied thereto from key set 25, into a unique coded signal, such as a multibit number, of the type which can be stored in a storage unit 45. In the particular embodiment described herein, decoder 44 converts each unique two-tone signal into a four digit binary (bit) number which is stored in unit 45, which hereafter may also be referred to as the buffer 45.

The operation of decoder 44 may best be explained in conjunction with the bottom half of FIG. 2, which is a truth table representing the binary levels on the four output lines of decoder 44 in response to each of the two-tone signals which may be supplied thereto. In response to a two-tone signal of 1300 and 1500 Hz., which represents the decimal digit O, the decoder provides signals of a first level representing a 1 or true (T) on the top lines L1 and L2, while a second level, representing a O, and hereafter referred to as false (F), is present on the bottom two lines, i.e., L3 and L4. On the other hand, when a decimal digit 1 is entered, and a two-tone signal of 700 and 900 Hz. is supplied through gate 42, the decoder provides a 1 only on line L3, while the other three lines are at the 0 or false level. It should be noted that for any one of the 10 digits, at least one of the lines is at the 1 level. The all zero level is used in the present system as a reset signal.

As each two-tone signal is supplied through gate 42, at least one of the decoder's output lines is a 1, which, when sensed, is used to actuate a clock unit 50, which in turn provides clocking signals to unit 45. As a result, each four bit number from decoder 44 is clocked into unit 45 for storage. Since the called station number is assumed to consist of 10 digits, unit 45 is selected to have a 10-cell storage capacity, so that each one of the four bit numbers, representing a different digit of the called station number is stored in one of the storage cells. Each cell consists of four flip-flops, each designed to store one of the bits.

The system of the present invention further includes 10 binary-to-decimal converters 51 through 60 (only 51 and 60 are shown in the FIG.). The composite function of all the 10 converters is to convert the 10 multibit numbers, stored in the storage unit, to 10 corresponding decimal digits for display in a display unit 65, to which the converters are coupled. Thus, the operator, while actuating the key on key set 25, is provided with a visual display of the digits which are being entered. This enables her to verify that the correct called station number is entered into the system.

It should be pointed out that the portions of the system so far described operate fast enough so that the storing and displaying of the digits occur as the operator actuates the key set and therefore, no additional time beyond that required in the manual mode to operate the key set, is necessary for the storing and displaying of the called station number.

As previously stated, in the manual mode of operation, after a front cord plug is connected to panel 12, the operator depresses KP button 16 to request a sender. Only when a sender is properly attached is a "sender attached condition" indicated by lamp 20, after which the operator inserts the called station number by means of the keys of set 25. This sequence of operation is modified when the novel system of the present invention is incorporated with the switchboard 10. In the CAR mode, the operator enters the called station number as soon as she receives it from the calling party. Indeed, this would be done simultaneously as the calling party recites the digits of the called station number in sequence, to minimize call processing time.

Once the called station number is entered, which results in the automatic storing of the number in unit 45 and the display thereof in unit 65, the operator performs the step of connecting the front cord plug to panel 12. In accordance with the teachings of the present invention, this connection is sensed by circuitry already incorporated in the switchboard 10, which, for the purposes of the present application, is shown in FIG. 2 as block 67. This condition, which hereafter may be referred to as the "front cord plug attached condition," is communicated as a signal from circuitry 67 to the CAR sense and control unit 40. The latter, upon receiving the "front cord plug attached condition" signal, automatically actuates the KP circuitry 18 in a manner analogous to that accomplished by manually depressing button 16. Thus, the system automatically requests a sender.

When a sender is actually attached, a condition generally indicated by the illumination of lamp 20, the SA circuitry 22 automatically supplies a sender-attached-condition signal to the CAR sense and control unit 40. This signal is used in unit 40 to enable the clock unit 50 in such a way that unit 50 supplies the storage unit 45 with a sequence of only 10 clock pulses, so that each of the multibit numbers stored therein is sequentially read out therefrom.

As each multibit number, which represents one digit of the called station number, is read out from unit 45, it is directly supplied to a binary-to-five-tone encoder 70, which reconverts each multibit number into a signal consisting of the same two tones which, in the decoder 44, were used to produce the same multibit number. Thus, for example, if the multibit number from storage unit 45 consists of the binary levels 1100, encoder 70 provides a signal comprised of tones at 1300 and 1500 Hz., corresponding to a decimal digit zero (O), while a two-tone signal consisting of frequencies 1100 and 1500 Hz. is produced by encoder 70 when the multibit number is 0011. The output of encoder 70 is directly supplied to outline 30 for use by the telephone system in a manner identical with that which is performed when the two-tone signals are directly supplied from the key set 25 in the manual mode.

The CAR sense and control unit 40 further includes a circuitry which supplies the ST circuitry 34 with a signal, a fixed interval after unit 40 receives the sender-attached-condition signal from circuitry 22. This interval is selected to be long enough to insure that all the 10 multibit numbers that were stored in unit 45 have been sequentially read out and converted into 10 corresponding two-tone signals output on outline 30. The signal which is supplied by control unit 40 to ST circuitry 34 corresponds to the end-of-message signal, produced by the manual actuation of button 32. Thus, the need for manually depressing the ST button 32 is eliminated. Thereafter, the operator is ready to aid in a succeeding call.

From the foregoing description, it should thus be appreciated that, when using the novel system of the present invention, three of the steps which have to be performed in the manual mode, are eliminated. These steps include actuating the KP button 16, observing the SA lamp 20 and the actuation of the ST button 32. In the present invention, the function of depressing the KP button 16 is automatically accomplished by a signal supplied by circuitry 67, upon the insertion of a connecting front cord plug into the outgoing trunk of panel 12. The function of the SA lamp 20 is completely eliminated, since, in the present invention, upon receiving a sender-attached-condition signal from circuitry 22, the system automatically outputs the multibit numbers representing the digits of the called station number, which were stored in unit 45. Also, the need for actuating the ST button 32 is eliminated, since the control unit 40 automatically supplies a signal analogous to the actuation of said button after the 10-digit number has been read out from the system through the encoder 70 and supplied to the outline 30. As a result, a significant reduction in processing time is realized.

Furthermore, by incorporating in the system of the invention the display unit 65 in which the received and entered called station number is displayed, the telephone system's efficiency, as well as its accuracy of operation, is enhanced. To appreciate this aspect, it is necessary to recall that in the manual mode of operation, the operator actuates the key set 25 to enter the called station number only after a sender is attached to the particular switchboard. Any mistake on the part of the operator in entering the number increases the period during which the sender has to be attached to the particular switchboard. Also, the operator has no means of determining the accuracy of the entered called station number. Any mistake on her part in operating the keys of set 25 will result in reaching an undesired number, and therefore requiring the operator to repeat the process. On the other hand, when using the present invention, the operator enters the called station number before the switchboard 10 is connected to the rest of the telephone system. Only after the operator confirms, by viewing display unit 65, that the correct number has been entered and stored in unit 45, does she connect the front cord plug to the output panel, which initiates the request for the sender, and the subsequent outputting of the called station number for processing. If, due to human error or key set malfunctions, such as worn or poorly adjusted contacts, the number displayed in unit 65 does not agree with the requested called station number, the operator can actuate a clear switch 72, to reset or clear storage unit 45 and, thereafter, enter therein the desired 10 digit number.

If desired, the outputs of converters 51 through 60 could also be supplied to a 10 digit printer (not shown) which, in response to an appropriate control pulse, could automatically print out the called station number. Thus, an additional step which at present is manually performed by an operator could be further eliminated to result in additional time saving.

It should be pointed out that in the embodiment of the invention shown in FIG. 1, once the content of the buffer 45 is read out and converted into two-tone signals in encoder 70 for transmission to the system via outline 30, the digits of the called station number are no longer available either in the storage unit 45 or in display 65, coupled thereto. This may be quite disadvantageous, particularly if the called station is reached on a first try and a busy signal is received, in which case the operator may want to reach the same station at a later time.

To eliminate this characteristic, in another embodiment of the present invention, the storage unit 45 is connected in a recirculating arrangement, so that, in addition to supplying the multibit numbers to the encoder 70, it restores the same binary numbers. Then, if a called station is reached and a busy signal is received therefrom, the called station number is still available. In such a situation, the operator may remove the connecting front cord plug from panel 12 and perform any desired functions while waiting for a period of time to elapse before attempting to again outpulse the digits of the called station. This is simply achieved by reinserting the connecting front cord plug in the panel 12. Such a connection automatically initiates the request for a sender which when properly attached, causes the reading out of the called station number stored in the buffer 45. Only after the telephone at the called station is answered, in a station-to-station call, or the designated party answers in a person-to-person call is the need for the called station number at an end. In such a case, the operator merely actuates clear switch 72 to clear both the buffer 45 and the display unit 65 coupled thereto.

Figure 3:
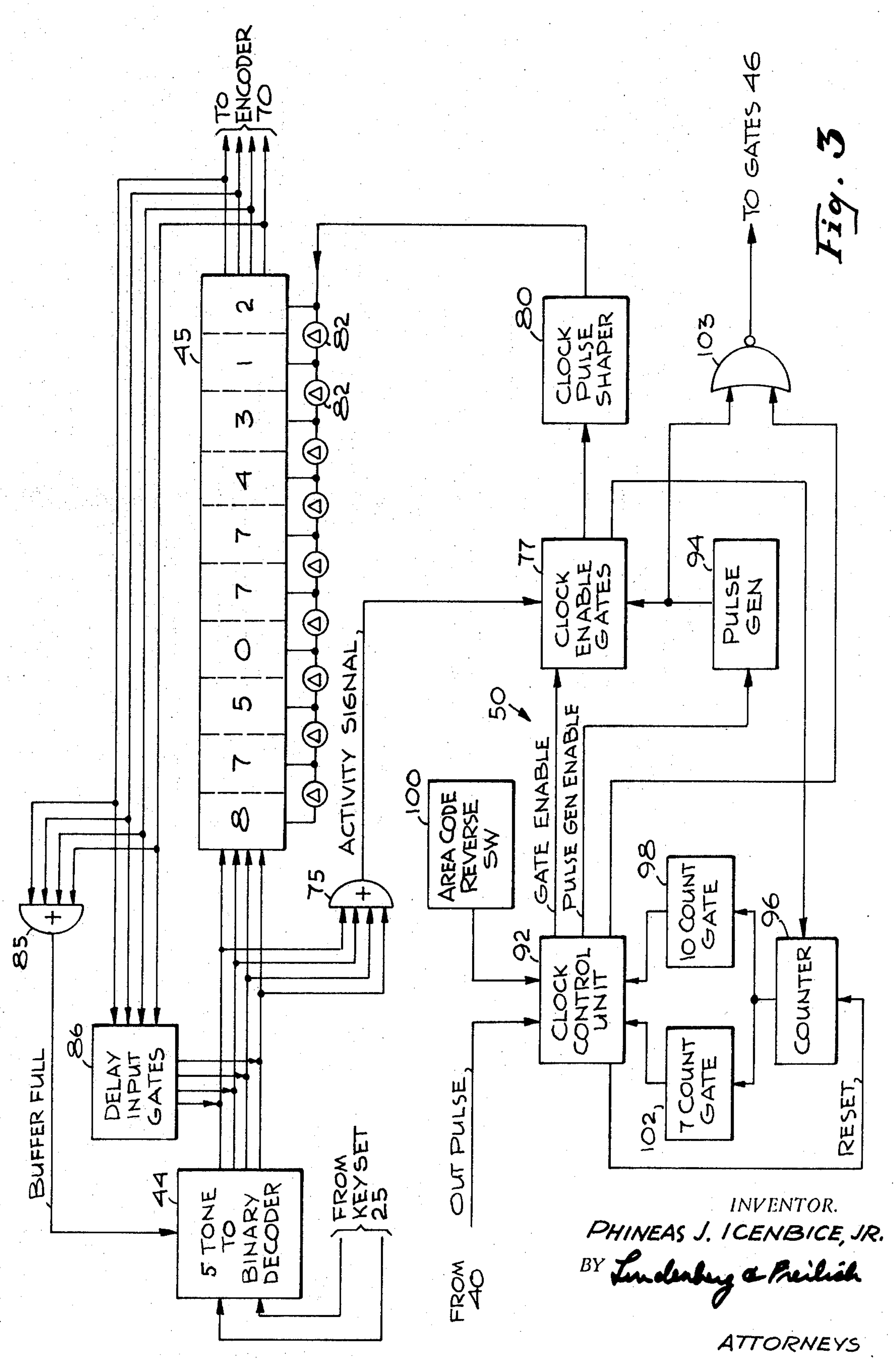
FIG. 3 is a partial block diagram of another embodiment of the invention.

For a better understanding of the latter-mentioned feature of the invention, as well as for a detailed explanation of the operation of the clock unit 50, reference is now made to FIG. 3. Therein elements like those shown in FIG. 1 are designated by like numerals. For explanatory purposes, let it be assumed that the called station number is 213 477-0578, where 213 designates the area code, 477 the central office (C.O.) number and 0578 the line number. As each decimal digit is entered by the operator by means of the key set, at least one of the output lines of the decoder 44 will be at a 1 or true binary level.

The four output lines are connected to an OR gate 75, which, in response to a 1 level on any of its inputs, will provide an activity-indicating signal to clock enable gates 77 to activate a clock pulse shaper 80 to provide a single clock pulse. Thus, in response to each digit, decoded by decoder 44, clock pulse shaper 80 is caused to provide a clock pulse to the buffer 45. The latter can be thought of as a serial input shift register, so that in response to each clock pulse the content of each one of its cells is transferred to a succeeding cell thereof.

In order to insure that the content from any cell is read out to a succeeding cell before the content of a preceding cell is transferred thereto, a plurality of delay units, all designated by numeral 82 are incorporated. Their function is to differentially delay the clock pulses supplied to the various cells of the buffer, so that the pulse at any given cell arrives later than a corresponding pulse at a succeeding cell, and before the same clock pulse is supplied to a preceding cell in the buffer.

After the 10 digits are entered into the buffer 45, in the form of 10 four-bit numbers, at least one of its output lines is at the 1 level, since one of the four-bit numbers is in the last or output cell. These output lines are connected to an OR gate 85, which provides a buffer-full signal whenever any of the output lines of the buffer is true, which occurs when the first entered four-bit number is succeedingly advanced through the buffer and is finally stored in the output cell thereof. In the present example, the output cell would store a multibit number corresponding to the decimal digit two (2), which is the first digit defining the area code number, and the input cell of the buffer 45 would store a multibit number, corresponding to the decimal digit eight (8), which is the last digit of the line number of the called station.

The four output lines of the buffer 45, in addition to being supplied to the encoder 70 and to the OR gate 85, are also supplied to the input lines of the buffer 45, through delay input gates 86. The function of the latter-mentioned gates is to delay each multibit number, read out from the buffer 45, so that it is transferred to the input cell of the buffer only after the previous content thereof has been advanced to a succeeding cell. For example, in the case diagrammed in FIG. 3, the multibit number corresponding to the digit 2 is delayed in gates 86 by a period of time sufficient for the multibit number corresponding to the digit 8 to have advanced to the next cell of buffer 45. Such a delay arrangement insures that none of the numbers stored in the buffer is lost or erased because of overlap of two numbers in the same cell.

As previously explained in conjunction with the CAR sense and control unit 40 (FIG. 1), when a sender-attached condition signal is received from circuitry 22, control unit 40 automatically supplies the clock unit 50 with an enabling signal hereafter also referred to as the outpulse, to cause it to supply a sequence of 10 clock pulses so that the content of the buffer 45 is sequentially read out. This aspect of the invention may better be understood by considering the rest of the circuitry diagrammed in FIG. 3.

As seen therefrom, the clock unit 50 includes clock control unit 92 which is supplied with the outpulse from control unit 40. When this pulse is received, it actuates unit 92 to supply a gate-enable signal to gates 77, as well as a pulse-generator-enable signal to a pulse generator 94, which is connected to gates 77. When the two are enabled, pulse generator 94 supplies signals at a fixed preselected frequency to shaper through gates 77. The clock pulse shaper 80 produces a corresponding sequence of clock pulses which is supplied to the buffer 45.

Clock unit 50 further includes a counter 96, which counts each of the signals supplied by generator 94. When the count in counter 96 reaches 10, a 10-count gate 98 is enabled to cause clock control unit 92 to disable both the gates 77 and the pulse generator 94 and thereby prevent any additional signals from being supplied to shaper 80. Consequently the number of clock pulses supplied to the buffer 45 is limited to 10. Thus, each time an outpulse is received from the CAR sense and control unit 40, the clock unit 50 operates to supply only 10 clock pulses at a fixed selected rate to the buffer 45. Since the latter is assumed to contain only 10 cells, a sequence of 10 clock pulses is sufficient to read the entire content of buffer 45 and supply it for encoding in encoder 70. The same 10 pulses recirculate the buffer content so that each cell restores the same multibit number previously stored therein.

The novel system of the present invention may further incorporate an area-code-reverse switch 100 and a 7-count gate 102, connected between counter 96 and the clock control unit 92. The function of switch 100 is to provide unit 92 with an enabling signal, similar to that provided by the outpulse from CAR sense and control unit 40. However, when unit 92 is enabled by a signal from switch 100, when the count is counter 96 reaches seven rather then 10, control unit 92 is activated to disable the pulse generator 94 and the clock enable gate 77. Thus, a sequence of only seven clock pulses is supplied to the buffer. Such a sequence merely rearranges the order of the digits which are stored in the various cells of buffer 45. This is necessary whenever the three digits, representing the area code, are entered by the operator as the last three of the 10 digit called station number, rather than as the first three, as required by the telephone system.

The clock unit 50 (FIG. 3) further includes a gate 103 whose two inputs are connected to the output of generator 94 and unit 92, and whose input is used to control the enabling of gates 64 between the buffer 45 and the encoder 70. When clock control unit 92 is enabled by an outpulse, each pulse from generator 94, which is supplied to gate 103, enables the gate to supply a corresponding enabling pulse to gates 46. The shape and rate of the pulses from generator 94 are controlled so that, the enabling pulses from gate 103 in turn enable gates 46 to meet specific requirements of the telephone system. In one specific example, the pulse rate from generator 94 is seven pulses per second (pps), with each pulse resulting in the enabling of the gates 46 for a period of approximately 70 milliseconds. Thus, during each pulse period of approximately 140 milliseconds, the gates 46 are enabled during the first half of each period and disabled during the other half.

Figure 4:
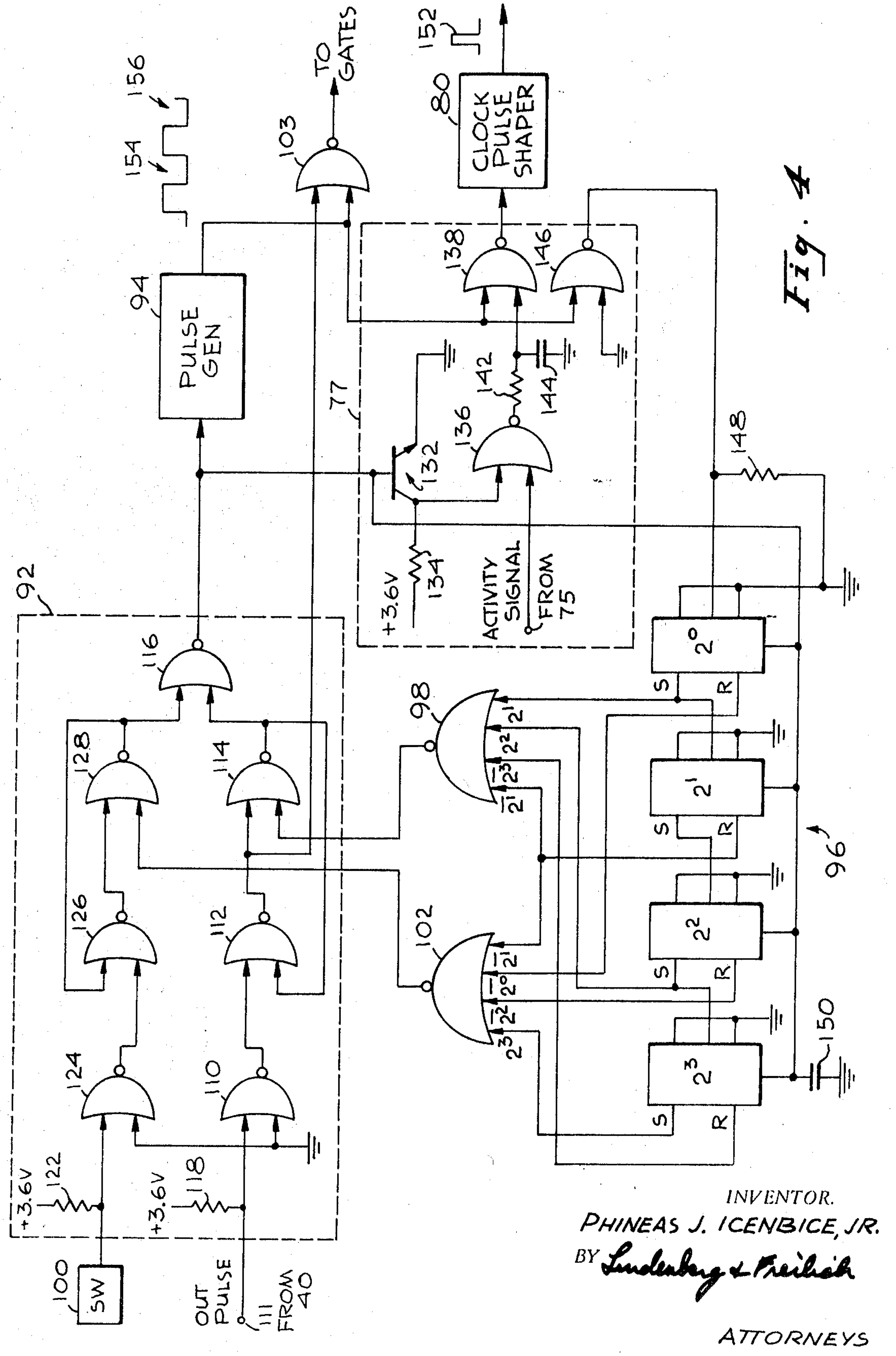
FIG. 4 is a detailed diagram of the clock unit 50 shown in FIGS. 1 and 3.

Reference is now made to FIG. 4 which is a more detailed block diagram of the clock unit 50, wherein like elements are designated by like numerals. As shown, the clock control unit 92 comprises an input gate 110 whose two inputs are connected respectively to ground and to a terminal 111 which receives the outpulse from control unit 40. All the gates shown in FIG. 4 are NOR gates. The output of gate 110 is connected to one input of gate 112 whose output is connected to one input of a gate 114, as well as to one input of gate 103. The output of gate 114 is also connected to another input of gate 112, as well as to one input of an output gate 116 of the control unit 92. The output of a 4-input NOR gate 98 is connected to another input of gate 114. Gate 98 represents the 10-count gate 98, shown in FIG. 3. A resistor 118 is connected between terminal 111 and a source of positive potential, such as +3.6 volts.

Similarly, a resistor 122 connects one input terminal of a gate 124 to the same source of positive potential. The latter gate input is connected to the area code reverse switch 100, while another input of the same gate is connected to ground potential. The output of gate 124 is connected to one input of a gate 126, whose input is connected to one input of a gate 128. The other input of gate 128 is connected to the output of gate 102, which defines the 7-count gate shown in FIG. 3. The output of gate 128 is supplied to another input of gate 126, as well as to another input of gate 116.

The output of NOR gate 116 is supplied to the pulse generator 94, as well as to the clock enable gates 77, which in FIG. 4 are shown comprising a transistor 132. The base of 132 is connected to the output of gate 116, its emitter is connected to ground and its collector to a source of positive potential, through a resistor 134. The collector of transistor 132 is also connected to one input of a NOR gate 136 whose other input is connected to receive the activity signal from gate 75 (FIG. 3). The output of gate 136 is connected to one input of a gate 138 through a resistor 142, which is also connected to ground through a capacitor 144. It is the output of gate 138 which is supplied to the clock pulse shaper 80 to energize it so as to supply the necessary clock pulses to the buffer 45.

The output of pulse generator 94 is supplied to another input of gate 138, as well as to one input of an inverting gate 146, whose other input is connected to ground. The output of gate 146 is used as the input to the input cell of a 4-cell counter 96. Each cell may take the form of a bistable element, such as a flip-flop, with the S output of each flip-flop connected as the input to a succeeding flip-flop. A resistor 148 is connected between the output of gate 146 or the counter input, while the base and ground of transistor 132 is connected to each one of the flip-flops, to provide it with a reset signal, as will be explained hereafter. The reset input of each of the flip-flops is connected to ground through a capacitor 150. The S and R outputs of the four counter flip-flops are connected to the four inputs of each OR gate 98 and 102 as shown.

The operation of the circuitry shown in FIG. 4 may best be explained by considering a ground level as false or zero (o), and a positive level as true or one (1). When the CAR system is initially turned on, the output of gate 116 is a 1 so that transistor 132 is in a conducting state and therefore its collector is substantially at ground. Thus the input to gate 136 connected to the collector is a 0. Also, at the same time the output of pulse generator 94 is a 0. Each activity signal, supplied from activity gate 75 (FIG. 3) produces a 0 level at the other input of gate 136, thereby causing its output to be a 1, which in turn results in a 0 output from gate 138. The latter 0 output enables the clock pulse shaper 80 to provide a clock pulse, such as the one designated by numeral 152. In essence, the pulse is approximately 5 microseconds in duration and of a positive 3 volts amplitude. Each of these clock pulses is supplied to the buffer 45 in order to clock each 4-bit number into it, as hereinbefore explained. The function of resistor 142 and capacitor 144 between gates 136 and 138 is to limit the rate at which enabling pulses could be supplied to the shaper 80 while the key set is operated by the operator.

It should be pointed out that when the operator operates the key set and enters each of the digits of the called station number into buffer 45, each clock pulse from shaper 80 is produced in response to the signals propagating through gates 136 and 138, rather than in response to pulses from generator 94, which is at this phase disabled with a 0 output. It should also be pointed out, that since the base of transistor 132 is at a 1 or positive level, all the flip-flops of counter 96 are in a reset state, in which the R outputs of the flip-flops are ones so that the outputs of both gates 98 and 102 are zeros.

In the absence of an output from sense and control unit 40 (FIG. 1), the input of gate 110 which is connected to the positive potential through resistor 118 is true or 1, resulting in a 0 output therefrom. This in turn causes gate 112 to provide a 1 output since both of its inputs are zeros. The 1 output from gate 112 causes gate 114 to provide a 0 output to gate 116. Similarly, in the absence of the actuation of the area code reverse switch 100, the input of gate 124 which is connected to the positive potential through resistor 122 is 1, so that the outputs of gates 124, 126 and 128 are 0, 1, 0, respectively. Since both inputs to gate 116 are zeros, its output is 1 as previously assumed.

However, when an outpulse is received from unit 40, which occurs when a sender-attached-condition signal is supplied to the control unit 40 from the switchboard, the resistor 118 is connected between 3.6 volts and ground so that both inputs to gate 110 are zeros, resulting in a 1 output therefrom. This in turn, causes gates 112 and 114 to provide 0 and 1 outputs respectively. The 1 output from gate 114 latches gate 112 to continue to provide a 0 output, as long as the output of gate 114 is a 1. This occurs as long as the output from gate 98 is a 0. The 1 output from 114 causes gate 116 to provide a 0 output which enables pulse generator 94. This signal corresponds to the pulse generator enable signal hereinbefore discussed in conjunction with FIG. 3. Also, the 0 output from gate 116 causes transistor 132 to be driven to a nonconductive state, so that its collector is at a high or a 1 level, and thereby disables gate 136, causing it to provide a 0 output to gate 138.

The pulse generator 94, which is enabled by a 0 output from gate 116 is designed to provide pulses at a fixed selected rate and pulse period. As previously indicated in one specific embodiment, generator 94 is designed to provide pulses at a rate of 7 pps, resulting in a pulse period of approximately 140 milliseconds. During the first half of each pulse period, the pulse level is a 1, while during the other half of each pulse period it is a 0. In FIG. 4, two pulses designated 154 and 156 are diagrammed at the output of the pulse generator 94.

Each pulse from generator is supplied to the gates 138 and 146, so that during the period portion when the pulse is at a 1 level, the outputs of the two gates are zeros. When the output of gate 138 is 0, it enables the clock pulse shaper 80 to provide one of the clock pulses, such as clock pulse 152. Thus, in response to each of the pulses from generator 94 a corresponding clock pulse is supplied by clock pulse shaper 80. Also, each of the clock pulses from generator 94, causes gate 146 to provide a 0 output pulse to the counter 96 which is counted therein.

As previously explained, the function of the counter 96 is to count the number of clock pulses supplied to the buffer 45, which in the presently described arrangement is accomplished by counting the number of pulses which generator 94 supplies to the shaper 80, through the clock enable gates 77.

When 10 pulses have been supplied by generator 94, resulting in 10 clock pulses having been supplied to buffer 45, as well as 10 pulses counted in counter 96, the flip-flops designated $2^3$ and $2^2$ are set while the flip-flops $2^1$ and $2^0$ are reset. As a result, all the four inputs to gate 98 are zeros which causes the gate to provide a 1 output to gate 114. When this occurs, the output of gate 114 switches from a 1 to a 0 level, which in turn causes gate 116 to provide a 1 output, disabling generator 94 from producing additional pulses. Consequently, the number of clock pulses which are supplied from shaper 80 to the buffer 45 is limited to 10, which is the exact number required to clock out the entire buffer content, as well as to recirculate and restore the content therein. When the output of gate 116 is a 1 the counter 96 is also reset.

Gates 124, 126 and 128 operate in a manner similar to gates 110, 112 and 114, except that the function of the former three gates together with gate 102, is to limit the number of clock pulses supplied to buffer 45 to seven, when the area code reverse switch 100 is actuated. As previously explained, the need to supply the buffer 45 with only seven signals arises whenever the operator enters the three area code digits at the end of the 10 digit called station number, rather than at the beginning.

When switch 100 is actuated, it in a sense connects resistor 122 between ground and the positive potential, so that both inputs to gate 124 are zeros, thereby causing it to provide a 1 output. Such an output results in gate 126 providing a 0 output and gate 128 a 1 output which in turn drives the output of gate 116 to a false or 0 level. As previously explained such a level enables the pulse generator 94 and the rest of the circuitry. The counter 96 again counts each of the pulses supplied from generator 94. When the count in counter 96 reaches seven, the four inputs to gate 102 are all zeros so that its output, which is supplied to gate 128, is a 1. As a result, the output level of gate 116 is switched from 0 to 1 and the pulse generator 94 is inhibited from supplying additional pulses. Thus, the number of pulses which are supplied from generator 94 and consequently the number of clock pulses from shaper 80 is limited to seven, which in turn results in the rearrangement of the digits stored in the buffer so that the three area code digits would be the first to be clocked out therefrom to the telephone system.

As seen from FIG. 4, the output of generator 94 is also supplied to the gate 103, whose other input is connected to the output of gate 112, which is at the 0 level when the sequence of 10 pulses is supplied to the buffer 45. Thus, when each pulse from generator 94 is at a 1 level, a 0 level is present at the output of gate 103, thereby providing an enabling level to gate 46, so that each four-bit number, which is read out from buffer 45, can pass through gates 46 to be converted into a two-tone signal in encoder 70 (FIG. 1).

Figure 5:
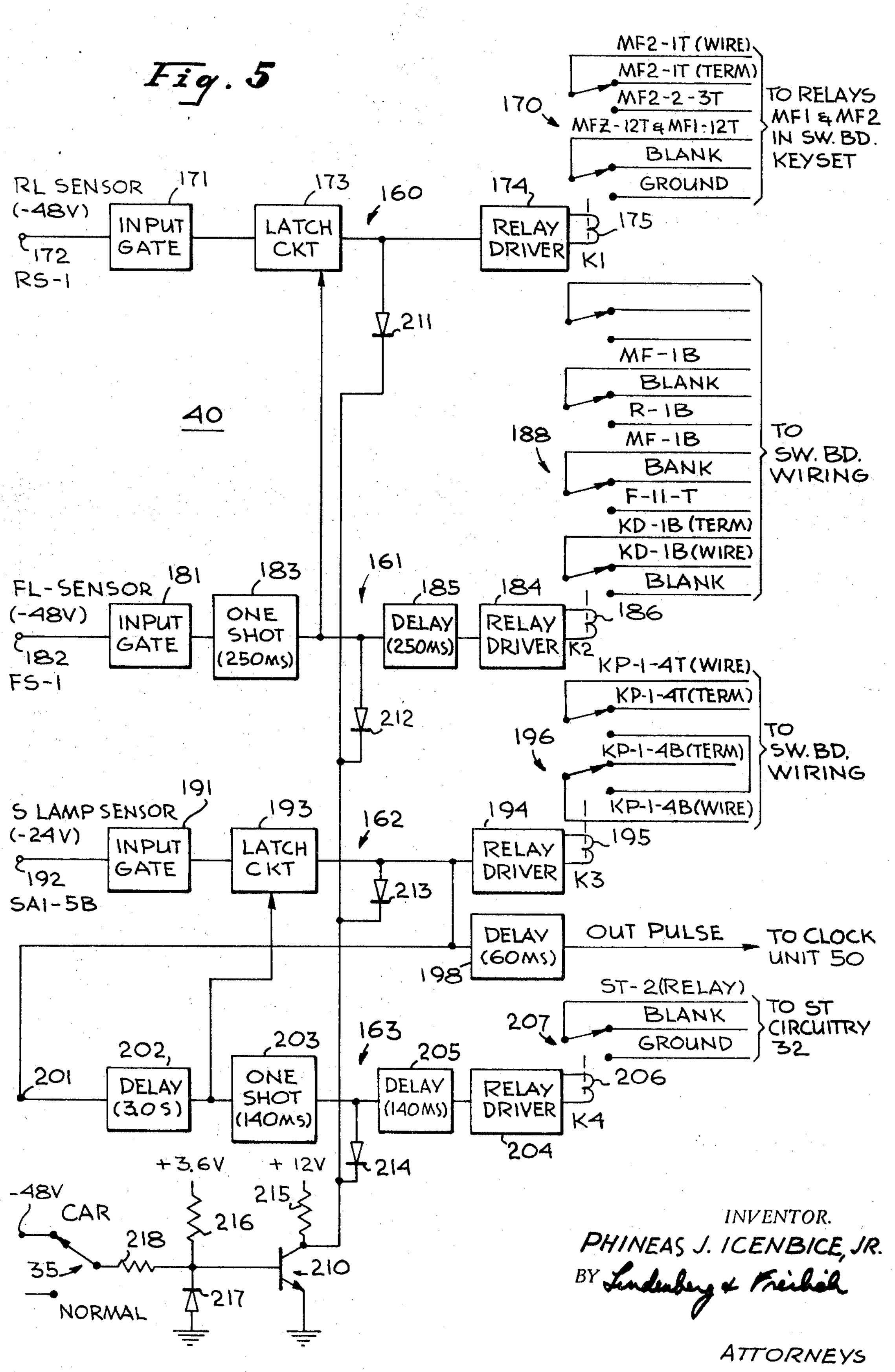
FIG. 5 is a detailed block diagram of the CAR sense and control unit 40, shown in FIG. 1.

Reference is now made to FIG. 5 which is a block diagram of the CAR sense and control unit 40, shown including four control circuits, designated by numerals 160 through 163. Briefly, the function of circuit 160 is to respond to a signal produced when an operator inserts a rear cord to communicate with a calling party. When such a signal is produced a relay K1 is driven to its ON state. The contacts of relay K1, which are generally designated by numeral 170, are connected to relays in the telephone switchboard, which are associated with the key set, so that when Kl is ON, any two-tone signal, produced in the key set, in response to the actuation of any of the keys by the operator, is supplied to decoder 44 (FIG. 1) through the input gate 42. Thus, switching K1 to ON is analogous to opening the input gate 42 to enable the supply of the two-tone signals to the decoder 44.

Control circuit 160 is shown including an input gate 171, whose input is connected to an input terminal 172 and its output to a latched circuit 173, with the output of the latter circuit being connected to the input of a relay driver 174. It is the function of the relay driver to apply a potential across the coil 175 of relay K1 in order to switch it to ON. The function of the latch circuit 173 is to enable driver 174 to maintain relay K1 in the ON state, even after the removal of the input signal at input terminal 172, until circuit 173 is unlatched.

Control circuit 161 is shown including an input gate 181 with an input terminal 182. The output of gate 181 is supplied to a one shot multivibrator or simply a one shot 183. The latter's output is supplied to a relay driver 184 through a delay unit 185. A coil 186 of relay K2 is connected to the output of driver 184. Input terminal 182 is connected in the switchboard to circuitry, which senses the insertion of the front cord by the operator in the switchboard panel 12, to supply an enabling signal to gate 181, which subsequently enables driver 184. When driver 184 enabled it applies a potential across coil 186, driving the relay K2 to its ON state. The contacts of relay K2, generally designated by numeral 188, are connected to the KP circuitry 18 (FIG. 1) in the switchboard 10, so that when relay K2 is ON, a signal analogous to pressing the KP button 16 is produced in the switchboard.

The one shot 183 is incorporated in the circuit 161 in order to limit the period of this signal by limiting the duration during which the driver 184 maintains relay K2 in the ON state. The output of the one shot 183 is also supplied to latch circuit 173, unlatching it to disable driver 174 which in turn results in deenergizing relay K1. To insure that the latter is deenergized or switched to the OFF state before relay K2 is switched to ON, the delay unit 185 is incorporated in the circuit 161.

The third control circuit 162, is similar to circuit 160, in that it consists of an input gate 191, with an input terminal 192. The output of gate 191 is connected to a latch circuit 193, whose output is in turn connected to a relay driver 184 with a coil 195 of a relay K3 being coupled to the driver's output. The contacts of relay K3 are generally designated by numeral 196. The input terminal 192 is connected to the SA circuitry 22 (FIG. 1) in order to respond to a signal, which represents a sender attached condition. In the manual mode, this condition results in the illumination of lamp 20, which indicates to the operator that the code station number could be entered by means of the key set. However, in the present invention, the signal automatically enables gate 191 which in turn enables relay driver 184 to switch the relay K3 to the ON state. The contacts 186 are connected to the switchboard circuitry in such a manner that when relay K3 is ON, signals to the out line 30 (FIG. 1) are supplied from encoder 70 rather than directly from the key set 25.

The signal which enables driver 184 is also supplied to a delay unit 198, whose output represents the outpulse which is supplied to the clock unit 50, as shown in FIG. 1 and described in greater detail in FIG. 4. The function of unit 198 is to delay the supply of the outpulse to the clock unit, in order to ensure that the clock unit is enabled only after relay K3 is in the ON state.

As previously explained, the outpulse enables the clock unit 50 so that the pulse generator 94 incorporated therein supplies a sequence of pulses at a fixed rate, such as seven pulses per-second. Since in the present exemplary description it is assumed that the buffer 45 stores 10 digits, it is appreciated that the minimum time required for clocking out the ten digits, stored therein, is approximately 1.5 seconds. In the manual mode, the operator after entering all the digits of the called station number, actuates the ST button 32 to provide the system with an end-of-called station number or an end-of-message signal.

In the present invention, this is accomplished by the control circuit 163 which responds to the enabling signal supplied to relay driver 184. This enabling signal is supplied to an input terminal of a delay unit 202. The output of unit 202 is used to trigger a one shot 203, as well as to unlatch circuit 193 and thereby cause relay K3 to be driven to the OFF state. The function of unit 202 is to delay the signal supplied to the one shot 203 by at least the time required for 10 clock pulses to be supplied to the buffer 45. The output of the one shot 203 is supplied to a relay driver 204 through a delay unit 205.

The function of driver 204, when enabled, is to energize a coil 206 of a relay K4 in order to switch it to the ON state. The relay contacts are designated by 207. The contacts are connected to the ST circuitry 34 (FIG. 1) in the switchboard, so that when relay K4 is ON, circuitry 34 automatically produces an end-of-message signal, analogous to the one produced when the ST button 32 is manually depressed. The function of the one shot 203 in circuit 163 is to limit the duration during which relay K4 is ON, while the function of delay units 205 is to delay the signal supplied to the relay driver 204 by a period sufficient to ensure that relay K3 is switched to the OFF state before relay K4 is switched ON.

The CAR sense and control unit 40 further includes a transistor 210, whose collector is connected to circuits 160 through 163, through diodes 211 through 214. The collector is also connected, through a resistor 215, to a source of positive potential, such as +12 volts, while its emitter is shown connected to ground. The base of transistor 210 is connected to a source of positive potential through a resistor 216, to ground through a diode 217, and through an input resistor 218 to the mode switch 35 (FIG. 1). The CAR terminal of switch 35 is connected to a source of negative potential, such as −48 volts, while the NORMAL terminal is open.

When the system of the present invention is not utilized, i.e., the operator selects to operate the switchboard in the manual or normal mode, transistor 210 is in a conductive state and therefore, its collector is practically at ground potential, forward biasing diodes 211 through 214 to ground. This in a sense disables drivers 274, 284, 294 and 204 to prevent them from actuating relays K1 through K4, respectively. However, when the operator desires to utilize the present system, and the mode switch 35 is switched to the CAR position, the base of transistor 210 is essentially connected to −48 volts, causing the transistor 210 to be switched to a nonconductive state and thereby back biasing diodes 211 through 214. When the latter four diodes are back biased, the relay drivers are free to respond to enabling signals as a function of the signals supplied at input terminals 172, 182, 192 and 201.

The time durations of the various signals produced by the various one shots diagrammed in FIG. 5, as well as the time delays produced by the various delay units, represent near optimum values, when the novel system of the present invention is incorporated for use with a Bell telephone switchboard Model 03 CL or the like. The legends near the input terminals and the various contact terminals relate to relays, terminals and wires in such a switchboard, as the case may be. For example, input terminal 172 is connected to a relay RS–1 which, in the Bell telephone switchboard, is associated with a rear light (RL) sensor. When the relay RS–1 is energized, which occurs when a rear cord is inserted in the switchboard panel, −48 volts is applied to input terminal 172. Similarly, input terminal 182 is connected to a relay FS–1 in the Bell telephone switchboard, which is associated with a front lamp (FL) sensor, to apply −48 volts to input terminal 182, when a front cord is inserted by the operator in the switchboard panel.

Summarizing the foregoing description, the present invention may be thought of as a system for automating certain steps, presently manually performed in processing a telephone call, in order to minimize call processing time, as well as to reduce the effect of human error on call processing. The system consists of control circuitry, unit 40, a multitone-signal-to-binary decoder 44, a multicell storage unit or buffer 45, with each cell capable of storing a multibit number, representing a single decimal digit, a multidigit display unit 65, and a binary-to-multitone signal encoder 70. The various system elements are interconnected to enable an operator, upon the insertion of a rear cord plug in the switchboard panel, to store each digit of the called station number in the storage unit as each key of the key set is operated by her. The display unit provides the operator with visual means to observe that the proper called station number has been entered, before a sender request is initiated. By inserting a front cord plug in the switchboard panel, the control circuitry of the present invention automatically supplies a switchboard with a sender-request signal, and automatically supplies the system with multitone signals representing the various digits of the called station number stored in the system, after a proper sender-attached-condition signal is received from the switchboard. After a time period, long enough for all the digits of the called station number to have been communicated to the switchboard of the telephone system, the novel system of the present invention automatically supplies an end-of-message signal, which herebefore had to be manually performed.

It should be pointed out, that certain of the elements hereinbefore described, such as the five-tone to binary decoder 44 (FIG. 1), the buffer 45, the display unit 65, and the binary-to-two-tone encoder 70 (FIG. 1) could be employed in other telephone applications. For example, the decoder, buffer and the display unit can be used quite advantageously in any system in which telephone lines are used to communicate with a computer or other data processing machine. Conventionally one using such a machine first dials a specific number to first make contact with the machine. This is often done by means of touch tone dial-type telephones which can also respond to a code on a punched card. After the machine or computer is reached, data in the form of numbers is either supplied thereto or received therefrom. In accordance with the teaching of this invention, it would be preferable to first enter each group of numbers into the buffer and at the same time display the numbers so that the sender could verify their accuracy.

Only after being satisfied that the proper numbers are stored in the buffer would an appropriate button be activated in order to transmit the number to the computer. The rate at which the numbers can be supplied to the computer is much higher than any presently achievable by manual touch tone dialing. Also, if desired, the numerical answers received from the computer could be entered in the buffer and displayed in the display unit. This would greatly facilitate the communication with the remotely located computer.

Although particular embodiments of the invention have been described and illustrated herein, it is recognized that modifications and variations may readily occur to those skilled in the art and consequently it is intended that the claims be interpreted to cover such modifications and equivalents.

I claim:

1. In a telephone system of the type including a key-pulse circuit including a manually operable element which, when actuated, communicates a sender-request signal to said system, a sender-attached circuit, including a lamp which, when illuminated, indicates a sender-attached-condition, a set of touch keys, each of which when actuated, causes the supply to an output line of said system a unique $n$-tone signal, selected out of a plurality of $x$ tones, a start circuit including a manually operable element which, when actuated, communicates an end-of-number signal to said system, said system further including means for sensing the connection of a cord circuit to said system to enable the attachment of a sender to said system, the arrangement comprising:

a decoder selectively connected to said key set to convert each $n$-tone signal representing a decimal digit into a related multibit number;

storing means for sequentially storing each multibit number, supplied thereto from said decoder;

display means coupled to said storing means for displaying, in decimal form, the digits stored in said storing means in the form of multibit numbers;

a first control circuit for supplying a first control signal to said key-pulse circuit to activate it to provide said sender-request signal;

a second control circuit coupled to said sender-attached circuit and responsive to a sender-attached-condition, indicated therein, for sequentially outputting the multibit numbers stored in said storing means, said second control circuit further including means coupled to said start circuit for supplying it with an end-of-number signal a fixed interval after the initiation of the outputting of said multibit numbers from said storing means; and encoding means whose output is connected to said system output line and coupled to respond to each multibit number which is output from said storage means for converting it into a corresponding $n$-tone signal for supply to said system output line.

2. The arrangement as recited in claim 1 further including means for rearranging the order of the multibit numbers stored in said storing means and the display of the decimal digits in said display means.

3. The arrangement as recited in claim 1 wherein said first control circuit is coupled to said means for sensing the connection of a cord circuit to supply said sender-request signal only after the reception of a connecting cord plug of said cord circuit is sensed by said means for sensing.

4. The arrangement as recited in claim 3 further including means for rearranging the order of the multibit numbers stored in said storing means and the display of the decimal digits in said display means.

5. The arrangement as recited in claim 4 wherein the maximum number storable in said storing means is $y$, $y$ being a number greater than a number definable as $z$, said means for rearranging includes means for changing the order in which the multibit numbers are stored by storing the last $z$ received multibit numbers ahead of the previously received y—z multibit numbers.

6. The arrangement as recited in claim 5 wherein y=10 and z=3.

7. In a telephone system of the type including a key set for communicating to said system each decimal digit of a multidigit called station number as a multitone signal, a key-pulse circuit for requesting sender means through which a call from a calling station, identifiable by a calling station directory number, is to be routed, a sender-attached circuit for providing a sender-attached-condition signal and a start circuit for indicating the end of a called station number, an arrangement comprising:

decoding means coupled to said key set for decoding each decimal digit communicated thereby into a corresponding coded digit;

storing means for storing the coded digits corresponding to the decimal digits of said called station number;

output means including a first control circuit coupled to said sender-attached circuit for sensing a sender-attached-condition signal providing thereby for communicating the coded digits stored in said storage means to said system; and a second control circuit coupled to said first control circuit and to said start circuit for providing an end of called station number after the coded digits have been communicated from said storing means.

8. The arrangement as recited in claim 7 wherein said output means further includes encoding means for encoding each coded digit supplied from said storing means into a digit having characteristics which are compatible with the characteristics of digits communicable to said system.

9. The arrangement as recited in claim 7 further including display means coupled to said storing means for displaying the called station number by decimal digits.

10. The arrangement as recited in claim 9 further including control means coupled to said storing means for selectively varying the order of the coded digits stored therein.

11. The arrangement as recited in claim 10 wherein said storing means has at least a $y$ digit storing capacity $y$ being a number which is greater than a number definable as $z$ and said control means for controlling the storing and display of the last $z$ of the $y$ digits received from said decoding means to be the first $z$ digits stored in said storing means and displayed by said display means.

12. The arrangement as recited in claim 7 wherein said key set communicates each decimal digit as a unique two-tone signal, said decoding means including means for decoding each unique two-tone signal into a multibit number, and said output means further including encoding means for encoding each multibit number, supplied thereto from said storing means, into a unique two-tone signal for communication to said system.

13. The arrangement as recited in claim 12 further including display means coupled to said storing means for displaying the called station number as decimal digits.

14. The arrangement as recited in claim 13 further including control means coupled to said storing means for selectively varying the order of the coded digits stored therein.

15. The arrangement as recited in claim 14 wherein said storing means has at least $y$ digit storing capacity, $y$ being a number which is greater than a number $z$, and said control means includes means for controlling the storing and display of the last $z$ of the $y$ digits received from said decoding means to be the first $z$ of the digits stored in said storing means and displayed by said display means.